United States Patent Office 3,396,223
Patented Aug. 6, 1968

3,396,223
INSECTICIDAL COMPOSITION CONSISTING OF TECHNICAL GRADE MALATHION AS A CARRIER HAVING DISSOLVED THEREIN CERTAIN OTHER MALATHION - SOLUBLE TECHNICAL GRADE SYNTHETIC ORGANIC INSECTICIDES
Frank Louis Stark, Jr., Princeton, N.J., assignor to American Cyanamid Company, Stamford, Conn., a corporation of Maine
No Drawing. Continuation-in-part of application Ser. No. 504,135, Oct. 23, 1965. This application Sept. 21, 1966, Ser. No. 580,857
9 Claims. (Cl. 424—200)

ABSTRACT OF THE DISCLOSURE

There is provided an improved over-all technical grade insecticidal composition of extended residual life consisting essentially of from about 25% to about 95% by weight of technical grade malathion and from about 5% to about 75% of technical grade malathion-soluble phosphate, thiophosphate, carbamate or chlorinated hydrocarbon insecticides.

---

This application is a continuation-in-part of my copending application for Letters Patent, Ser. No. 504,135, filed Oct. 23, 1965, now abandoned.

The present invention relates to novel pesticidal compositions. More particularly, it relates to pesticidal compositions ideally adapted to low volume applications comprising the utilization of technical malathion as an active carrier and at least 5%, by weight, of at least one diverse malathion-soluble, technical grade synthetic organic insecticide.

As is known, the pesticidal art is replete with references directed to active compositions of both liquid and dry formulation types which contain either one or a plurality of pesticides. Mixtures of pesticides have been employed effectively for the control of a variety of insects. Whether such formulations have been in the liquid or dry form when applied, all such formulations contain a common ingredient. Specifically, all contain a substantial proportion of an inert carrier, diluent, solvent, extender or a mixture of the latter. Such inert carriers have included water, fuel oil or relatively inexpensive aromatic solvents in preparing liquid formulations. Where dry formulations have been required, finely divided clay, pumice, talc, vermiculite, ground corn cobs have been selected. These materials function to extend or increase the volume of material to be applied. As such, they have not contributed to the enhancement of the activity of the formulations. Further, such adjuvants, as emulsifiers, surface active agents or spreading and sticking agents, have been included in formulations so as to effect increased insect control. Theoretically, increased control has been associated with a more uniform dispersion of the active insecticidal ingredient in the diluent or carrier as well as both uniform and complete coverage of the surface to be protected against insect attack and longer adherence or sticking of the pesticidal composition.

In the foregoing context, it has been long recognized that diluents for malathion (i.e., O,O-dimethyl phosphorodithioate of diethyl mercaptosuccinate) adversely affect its residual insecticidal effectiveness. For instance, water emulsions of malathion or formulations prepared with oils and most other organic solvents which are commonly employed have an insecticidally effective residual life of usually from about three to about five days, whereas undiluted, technical grade malathion is found to have a residual lift of from about six to about twenty-five days, depending upon the species of insect sought to be controlled.

Skilled agriculturists have also recognized that malathion is not economically effective against all species of insects and will not protect the wide variety of economic crops, cultivated throughout the world, from all forms of insect attack. Although malathion has found acceptance as an insecticide, it is not totally effective for a sufficiently long period of time to provide good, practical protection. For instance, cotton plants are subject to attack from boll weevils, cotton aphids, leafhoppers, white flies or lygus bugs. These insects are controlled by malathion. However, since cotton plants are also subject to attack by bollworms and mites which are more effectively controlled by insecticides, such as methyl parathion and 4,4-dichloro-α-trichloromethylbenzhydrol, respectively, mixtures of the latter and malathion are employed.

Similarly, malathion is highly effective in controlling sap beetles, thrips, aphids and grasshoppers on corn plants. However, assistance from other insecticides, such as 2,2-bis-(p-chlorophenyl)-1,1,1-trichloroethane, is helpful for good control of corn earworms. In similar manner, malathion is highly effective against aphids, grasshoppers, alfalfa weevil larvae, leafhoppers, and lygus bugs, which infest alfalfa. However, for optimum control of these pests including the satisfactory control of spittlebugs on this crop, a pesticide, such as 2,2-bis(p-methoxyphenyl)-1,1,1-trichloroethane, is required. Hence, malathion and another pesticide in admixture is employed. Moreover, on fruits, malathion is effective in controlling scales, mealybugs and aphids. Nonetheless, on such fruits other pesticides, such as O,O-dimethyl S - (4 - oxobenzotriazine - 3-methyl)phosphorodithioate and dichlorodiphenyldichloroethane, are more effective for controlling the codling moth, plum curculio, oriental fruit or leaf roller and mites. Consequently, it is desirable to employ malathion in combination with other insecticides as hereinabove stated.

The formulations as prepared, unfortunately, do not provide the lasting protection against the insects for which malathion is employed. Apparently, the lack of desirable prolonged protection is attributable to the use of diluents or carriers which invariably have an adverse affect on the residual activity of the malathion. It is, therefore, unexpected and entirely surprising to find that the dissolution of various technical grade insecticides, namely, the hereinbelow defined chlorinated hydrocarbons, organic phosphates, organic carbamates, in technical grade malathion provides an overall mixture which does not adversely affect either the biological or residual insecticidal activity of malathion.

According to the present invention, a composition comprising technical grade malathion, either of the ordinary or deodorized type, in an amount ranging from about 25% of 95% and the balance of from 75% to 5%, respectively, being at least one other technical grade pesticide, can be readily prepared. Malathion is employed as the carrier for other pesticide additives which are either partially or wholly soluble in malathion. For optimum insecticidal activity, such compositions or formulations are prepared without the use of co-solvents, emulsifiers, surface active agents, sticking or spreading agents, diluents or equivalents thereof. However, the inclusion of the latter will not completely nullify either the increase in activity or the improved residual life of the formulations of the invention. Nonetheless, such inclusion will generally reduce, in small measure, the overall magnitude of the enhancement otherwise attained by the practice of the present invention.

It is a further advantage of the invention that formulations prepared as indicated above and applied to plants so as to protect them from insecticidal attacks have a substantially longer residual effect than do conventional formulations applied to similar plants at equivalent rates of insecticidal toxicant.

In referring to the diverse, malathion-soluble pesticides contemplated by the instant invention, there are illustrated pesticides by both their generic and trade names.

Cygon dimethoate—O,O-dimethyl S-(N - methylcarbamoylmethyl) phosphorodithioate
Parathion—O,O-diethyl O-p-nitrophenyl phosphorothioate
Methyl parathion—O,O-dimethyl O-p-nitrophenyl phosphorothioate
Sumithion—O,O-dimethyl-O-(3-methyl - 4 - nitrophenyl) thionophosphate
Methyl Trithion®—O,O-dimethyl S-p - chlorophenylthiomethyl phosphorodithioate
Zectran®—methyl-4-dimethylamino-3,5-xylyl carbamate
DDT—2,2-bis(p-chlorophenyl)-1,1,1-trichloroethane
TDE—dichlorodiphenyl dichloroethane
Toxaphene—chlorinated camphene
Strobane®—terpene polychlorinate
Abate®—O,O,O′,O′-tetramethyl-O,O′ - thiodi - p - phenylene phosphorothioate
Methoxychlor—2,2-bis(p-methoxyphenyl)-1,1,1-tri - chloroethane
Kelthane®—4,4′-dichloro-α-trichloromethylbenzhydrol
Bidrin®—3-(dimethoxyphosphinyloxy) - N,N - dimethyl-cis-crotonamide
DDVP—dimethyl 2,2-dichlorovinyl phosphate
Dibrom®—dimethyl-1,2-dibromo-2,2-dichloroethyl phosphate
Karathane®—2,4-dinitro-6-(2-octyl)phenyl crotonate
Phosphamidon—dimethyl 2-chloro-2 - diethylcarbamoyl-1-methyl vinyl phosphate
Sevin®—N-methyl-1-naphthyl carbamate
Thimet®—O,O-diethyl - S - (ethylthiomethyl) phosphorodithioate
Guthion®—O,O-dimethyl S-(4-oxobenzotriazine-3 - methyl) phosphorodithioate
Delnav®—2,3-p-dioxane S,S-bis(O,O-diethylphosphorodithioate)
Diazinon®—O,O-diethyl O-(2-isopropyl-4-methyl-6-pyrimidinyl) phosphorothioate
Ethion—O,O,O′,O′-tetraethyl S,S′- methylene bis - phosphorodithioate
Phosdrin®—dimethyl 2-methoxycarbonyl-1 - methylvinyl phosphate
Trithion®—O,O-diethyl S-p-chlorophenylthiomethyl phosphorodithioate
Thiodan®—6,7,8,9,10,10-hexachloro-1,5,5a,6,9,9a - hexahydro-6,9-methano-2,4,3-benzodioxathiepin-3-oxide
Tedion®—2,4,5,4′-tetrachlorodiphenyl sulphone
Ciodrin®—alpha-methylbenzyl 3-(dimethoxyphosphinyloxy)cis-crotonate
Lethane®—2-(2-butoxyethoxy) ethyl ester
Phostex®—bis(dialkylphosphinothioyl)disulfide
Dicapthon—O,O-dimethyl O-2-chloro-4-nitrophenyl phosphorodithioate The solubilities of the above technical grade pesticides in technical malathion are determined by utilizing well known standard methods. These solubilities are summarized in Table I below:

TABLE I

| Pesticide: | Solubility in malathion, technical grade |
|---|---|
| Bidrin (80% technical) | Miscible. |
| Ciodrin (86% technical) | Do. |
| DDVP (100% technical) | Do. |
| Delnav (100% technical) | Do. |
| Dibrom (90%) | Do. |
| Diazinon (94% technical) | Do. |
| Ethion tech | Do. |
| Ethyl Parathion (98%) | Do. |
| Karathane tech | Do. |
| Abate | Do. |
| Lethane 384 (80% conc.) | Do. |
| Nialate tech | Do. |
| Phosphamidon Tech | Do. |
| Phostex tech | Do. |
| Phosdrin tech | Do. |
| Sumithion (98% technical) | Do. |
| Thimet tech | Do. |
| Trithion (95%) | Do. |
| Methyl Trithion (91.3%) | Do. |
| Cygon tech | 25%. |
| DDT tech | 20%. |
| TDE | 20%. |
| Guthion (92% tech.) | 20%. |
| Methoxychlor (90%) | 25%. |
| Methyl Parathion | 25%. |
| Sevin tech | 5%. |
| Tedion | <10%. |
| Thiodan | <10%. |
| Zectran | 15%. |
| Dicapthon | 33%. |
| Kelthane (85% tech.) | Miscible. |
| Strobane (100% tech.) | Do. |
| Toxaphene (100% tech.) | Do. |

Advantageously, there is a substantial saving in utilizing technical grades of toxicant mixtures in which malathion is a major component. This is due to the fact that technical grade malathion can be applied at a rate of 8 ounces, or less, per acre as contrasted to the application of conventional malathion emulsifiable concentrates using 12.5 to 20 ounces in 3 gallons of water per acre.

In order to illustrate the invention with greater particularity, the following examples are presented. These are not to be taken as limitative of the invention, but are merely illustrative of the best mode of operation.

Example 1

This example illustrates the preparation of formulations involving the dissolution of technical malathion in certain technical grade chlorinated hydrocarbons, organic phosphates and organic carbamates. The over-all solution is on a weight/weight basis and surface tension data are summarized in Table II below.

TABLE II.—PREPARATION OF TECHNICAL INSECTICIDE MIXTURES

| Weight Percent Malathion Technical | Technical (T) Insecticide | Wt. Percent | Ratio | Surface Tension (in Dynes/cm. at 77° F.) |
|---|---|---|---|---|
| 100 | | | | 38.9 |
| 80 | DDT | 20 | 4:1 | |
| 33.3 | Toxaphene (90%) | 66.6 | 1:2 | 41.2 |
| 75 | Dimethoate | 25 | 3:1 | 40.3 |
| 75 | Methyl Parathion (80%) | 25 | 3:1 | 39.6 |
| 75 | Methyl Parathion (95%+) | 25 | 3:1 | 40.9 |
| 75 | Methoxychlor | 25 | 3:1 | 37.5 |
| 75 | Methyl Trithion® (91%+) | 25 | 3:1 | 40.8 |
| 67 | Kelthane® (85%) | 33 | 2:1 | 41.6 |
| 50 | Strobane® | 50 | 1:1 | 42.1 |
| 85.7 | Zectran® | 14.3 | 6:1 | 39.5 |
| 50 | Sumithion (98%) | 50 | 1:1 | 42.0 |
| 67 | Parathion | 33 | 3:1 | 40.1 |

For purposes of comparison, emulsifiable concentrates of toxicants in proportions equivalent to the toxicants in the above-illustrated technical compositions are prepared as set forth in Table III below.

placed in a 4-oz. wide-mouth bottle. The bottle was covered with two layers of cheese cloth. After the weevils and the treated plants were transferred to the holding room at 80° F. and approximately 60% R.H., the cheese

TABLE III.—PREPARATION, EMULSIFIABLE CONCENTRATES

[Malathion insecticide]

| Gms. of commercial Malathion 57% EC*/ 100 gm. | Percent/ Malathion in Final Spray | Commercial Insecticide Formulation | Gms. of Formulation | Gms. of Actual Insecticide | Ratio | Surface Tension (Dynes/ cm. at 77° F.) |
|---|---|---|---|---|---|---|
| 8.33 | 4.75 |  |  |  |  | 27.9 |
| 8.33 | 4.75 | 25% DDT EC | 38.0 | 9.5 | 1:2 | 31.5 |
| 8.33 | 4.75 | 25% DDT EC | 4.8 | 1.2 | 4:1 |  |
| 8.33 | 4.75 | 60% Toxaphene EC | 15 | 9.5 | 1:2 | 31 |
| 8.33 | 4.75 | 30.5% Dimethoate EC | 5.23 | 1.6 | 3:1 | 32.8 |
| 8.33 | 4.75 | 67% Methyl Parathion EC | 2.37 | 1.6 | 3:1 | 31 |
| 8.33 | 4.75 | 24% Methoxychlor EC | 6.60 | 1.58 | 3:1 |  |
| 8.33 | 4.75 | 25% Methyl Trithion® EC | 6.4 | 1.58 | 3:1 |  |
| 8.33 | 4.75 | 18.5% Kelthane® | 12.8 | 2.38 | 2:1 |  |
| 8.33 | 4.75 | 42% Strobane® | 11.3 | 4.75 | 1:1 |  |
| 8.33 | 4.75 | 25% Zectran® EC | 3.16 | 0.79 | 6:1 |  |
| 8.33 | 4.75 | 48% Sumithion | 9.8 | 4.75 | 1:1 |  |
| 8.33 | 4.75 | 25% Parathion | 6.4 | 1.58 | 3:1 |  |

*Emulsifiable concentrate.

Example 2

The activities of illustrative insecticidal formulations as shown in Tables II and III above are compared in this example.

In side by side tests the conventional formulations and the improved formulations were applied by a mist-settling tower to young Sieva lima bean plants at the rate of 3 mg. of actual toxicant material per square foot. The treated plants were transferred to a plant culture room at 76° F.–80° F. and approximately 60% R.H. for aging. At various time intervals, the treated primary leaves were bioassayed using confused flour beetles (*Tribolium confusum*) and cotton boll weevils (*Anthonomus gradis*). Groups of ten adult weevils were removed from the culture cage and cloth was removed and the bottle was inverted quickly on the treated primary leaf. The leaves were supported by petri dishes resting on a wooden box. The weevils were exposed continuously for one day at which time mortality counts were made.

Groups of 25 adult confused flour beetles were aspirated from the stock culture and placed in a small cage. The cage is made of ¼ inch long Pyrex glass tubing having a 40.5 mm. inside diameter wide one end covered with 40-mesh stainless steel screen. The open end of the cage is held to the leaf with a paper clamp. The leaf is supported in a horizontal position by a ring stand. The confused flour beetles are exposed continuously for 2 to 24 days at which time mortality counts are made. The data are set forth in Tables IV and V below.

TABLE IV.—PERCENT MORTALITY OF ADULT CONFUSED FLOUR BEETLES EXPOSED TO 3 MG. OF THE COMBINATION (ACTUAL PESTICIDE) PER SQUARE FOOT

| Materials | Ratio | Formulation | Age of Residue in Days | | | | | | | | | | | | |
|---|---|---|---|---|---|---|---|---|---|---|---|---|---|---|---|
|  |  |  | 0 | 2 | 3 | 5 | 6 | 7 | 9 | 10 | 12 | 13 | 17 | 20 | 23 | 24 |
| Malathion |  | EC[1] | 100 | 100 |  | 100 |  | 100 | 0 |  |  |  |  |  |  |  |
| Do |  | T[2] | 100 | 100 |  | 100 |  | 100 | 100 |  | 96 |  |  | 100 |  |  |
| Malathion:Cygon[3] Dimethoate | (3:1) | EC | 100 | 100 |  | 100 |  | 76 | 4 |  | 4 |  |  |  |  |  |
| Do | (3:1) | T | 100 | 100 |  | 100 |  | 100 | 100 |  | 100 |  |  |  |  |  |
| Malathion:Parathion | (3:1) | EC | 100 |  | 100 |  | 100 |  |  | 100 |  | 92 | 100 | 96 |  | 100 |
| Do | (3:1) | T | 100 |  | 100 |  | 100 |  |  | 100 |  | 100 | 100 | 100 |  | 100 |
| Malathion:Methyl Parathion | (3:1) | EC | 100 | 100 |  | 4 |  | 4 | 0 |  |  |  |  |  |  |  |
| Do | (3:1) | T | 100 | 100 |  | 100 |  | 100 | 100 |  | 100 |  |  | 100 |  |  |
| Malathion:Sumithion | (1:1) | EC | 100 |  | 100 |  | 100 |  |  | 96 |  | 56 | 72 | 12 |  | 0 |
| Do | (1:1) | T | 100 |  | 100 |  | 100 |  |  | 100 |  | 100 | 100 | 100 |  | 100 |
| Malathion:Methyl Trithion® | (3:1) | EC | 100 |  | 100 |  | 100 |  |  | 0 |  | 4 | 0 |  |  |  |
| Do | (3:1) | T | 100 |  | 100 |  | 100 |  |  | 100 |  | 100 | 100 | 24 |  | 100 |
| Malathion:Zectran® | (6:1) | EC | 100 |  | 100 |  | 100 |  |  | 100 |  | 96 | 8 | 4 |  | 0 |
| Do | (6:1) | T | 100 |  | 100 |  | 100 |  |  | 100 |  | 100 | 100 | 100 |  | 100 |
| Malathion:DDT | (4:1) | EC | 100 |  | 100 |  | 4 |  |  | 12 |  | 0 | 4 |  |  |  |
| Do | (4:1) | T | 100 |  | 100 |  | 100 |  |  | 100 |  | 100 | 100 | 20 |  | 8 |
| Malathion:Toxaphene | (2:1) | EC | 100 |  | 100 |  | 100 |  |  | 100 |  | 4 | 0 | 0 |  | 0 |
| Do | (2:1) | T | 100 |  | 100 |  | 100 |  |  | 100 |  | 100 | 100 | 100 |  | 100 |
| Malathion:Strobane® | (1:1) | EC | 100 |  | 100 |  | 12 |  |  | 4 |  | 0 | 0 |  |  |  |
| Do | (1:1) | T | 100 |  | 100 |  | 100 |  |  | 100 |  | 100 | 100 | 96 |  | 100 |
| Malathion:Methoxychlor | (3:1) | EC | 100 |  | 100 |  | 100 |  |  | 100 |  | 100 | 100 | 100 |  | 72 |
| Do | (3:1) | T | 100 |  | 100 |  | 100 |  |  | 100 |  | 100 | 100 | 100 |  | 100 |
| Malathion:Kelthane® | (2:1) | EC | 100 |  | 100 |  | 100 |  |  | 100 |  | 100 | 100 | 100 |  | 0 |
| Do | (2:1) | T | 100 |  | 100 |  | 100 |  |  | 100 |  | 100 | 100 | 100 |  | 100 |
| Malathion:Dicapthon | (2:1) | EC | 100 |  | 100 |  |  | 100 |  | 33 |  | 35 | 0 |  |  |  |
| Do | (2:1) | T | 100 |  | 100 |  |  | 100 |  |  |  | 100 | 100 | 100 | 100 | 100 |

[1] Trademark. [2] EC is emulsifiable concentrate. [3] T is technical.

TABLE V.—PERCENT MORTALITY OF ADULT COTTON BOLL WEEVILS EXPOSED TO 3 MG. OF THE COMBINATION (ACTUAL PESTICIDE) PER SQUARE FOOT

| Composition | Ratio | Formulation | Age of Residue in Days | | | |
|---|---|---|---|---|---|---|
| | | | 5 | 7 | 8 | 9 |
| Malathion | | EC [1] | 0 | 0 | | |
| Do | | T [2] | 100 | 80 | | |
| Malathion:Dicapthon | (2:1) | EC | 85 | 20 | | |
| Do | (2:1) | T | 100 | 100 | | |
| Dicapthon | | EC | 35 | 0 | | |
| Malathion:Parathion | (3:1) | EC | | | 60 | 30 |
| Do | (3:1) | T | | | 100 | 90 |
| Malathion:Sumithion | (1:1) | EC | | | 0 | 60 |
| Do | (1:1) | T | | | 100 | 100 |
| Malathion:DDT | (4:1) | EC | | | 0 | 0 |
| Do | (4:1) | T | | | 40 | 80 |
| Malathion:Strobane ® | (1:1) | EC | | | 0 | 10 |
| Do | (1:1) | T | | | 80 | 100 |

[1] EC is emulsifiable concentrate. [2] T is technical.

The data as shown in Tables IV and V show that the conventional EC formulations tested lost their insecticidal effectiveness from about 4 to 20 days after application. The data also show that the formulations of the instant invention are 100% effective 24 days after application.

Example 3

In side-by-side tests, technical malathion, an emulsifiable concentrate mixture, and the hereinbelow identified technical malathion-technical pesticide mixtures are applied in a mist-settling tower to young Sieva lima bean plants at the rate of 3 milligrams of actual toxicant material per square foot. The treated plants are transferred to a plant culture room maintained at between about 76° F.–80° F. and approximately 60% R.H. for aging. At various time intervals, leaves from the treated plants are removed and placed in Petri dishes which are lined with moist filter paper. Ten third-instar armyworm larvae (*Prodenia eridania*) are placed in the Petri dishes. Next, the dishes are returned to the plant culture room, held there for two days, and then removed and examined. Mortality counts are made for each day and percent mortality calculated and recorded in Table VI below.

TABLE VI.—PERCENT MORTALITY OF SOUTHERN ARMYWORMS

| Composition | Ratio | Percent Mortality | | |
|---|---|---|---|---|
| | | Age of Residue in Days | | |
| | | 0 | 8 | 15 |
| Technical grade malathion | | 100 | 98 | 40 |
| EC [1] malathion+EC [1] methyl parathion | 3:1 | 100 | 45 | 13 |
| Technical grade malathion+ technical garde methyl parathion | 3:1 | 100 | 100 | 95 |

[1] EC is emulsifiable concentrate.

From a consideration of the above data, it is clear that the technical grade mixture of the pesticides possesses an unexpectedly enhanced extended residual effectiveness.

Advantageously, the present invention provides for the elimination of an inert carrier. Rather, it provides for a means of applying technical grade pesticides which do not readily lend themselves to low volume application. Of the toxicants hereinabove identified, more than one-third are solids at room temperature. As such, they normally require a solvent or other carrier for distribution. Others are viscous liquids which generate problems in handling and distibution. Still others are far too toxic in technical form to permit safe application as such.

I claim:

1. An improved over-all technical grade insecticidal composition of extended residual life consisting of: between about 25% and 95% by weight of technical grade malathion having dissolved therein, from about 5% to about 75% of a technical grade, a malathion-soluble, synthetic organic insecticide wherein the malathion-soluble insecticide is one selected from the group consisting of O,O-dimethyl S-(N-methylcarbamoylmethyl) phosphorodithioate, O,O-diethyl O-p-nitrophenyl phosphorothioate, O,O-dimethyl O-p-nitrophenyl phosphorothioate, O,O-dimethyl-O-(3-methyl-4-nitrophenyl)thionophosphate, O,O-dimethyl O-2-chloro-4-nitrophenyl phosphorothioate, O,O-dimethyl S-p-chlorophenylthiomethyl phosphorodithioate, methyl-4-dimethylamino-3,5-xylyl carbamate, 2,2-bis(p-chlorophenyl) - 1,1,1 - trichloroethane, chlorinated camphene, terpene polychlorinate, 2,2-bis(p-methoxyphenyl)-1,1,1-trichloroethane, 4,4'-dichloro-α-trichloromethylbenzhydrol, 3-(dimethoxyphosphinyloxy) - N,N - dimethyl-cis-crotonamide, dimethyl 2,2-dichlorovinyl phosphate, dimethyl-1,2-dibromo-2,2-dichloroethyl phosphate, 2,4-dinitro-6-(2-octyl)phenyl crotonate, dimethyl 2-chloro-2-diethylcarbamoyl-1-methyl vinyl phosphate, N-methyl-1-naphthyl carbamate, O,O-diethyl S-(ethylthiomethyl) phosphorodithioate, O,O-dimethyl S-(4-oxobenzotriazine-3-methyl) phosphorodithioate, 2,3-p-dioxane S,S-bis(O,O-diethylphosphorodithioate), O,O-diethyl O-(2-isopropyl-4-methyl-6-pyrimidinyl) phosphorothioate, O,O,O',O'-tetraethyl S,S'-methylene bis-phosphorodithioate, O,O,O', O'-tetramethyl O,O'-thiodi-p-phenylene phosphorothioate, dimethyl 2-methoxycarbonyl-1-methylvinyl phosphate, O,O-diethyl S-p-chlorophenyl thiomethyl phosphorodithioate, 6,7,8,9,10,10-hexachloro-1,5,5a,6,9,9a-hexahydro-6,9-methano-2,4,3-benzodioxathiepin-3-oxide, 2,4,5,4' - tetrachlorodiphenyl sulphone, alpha-methylbenzyl 3-(dimethoxyphosphinyloxy)-cis-crotonate, 2-(2-butoxyethoxy)ethyl ester and bis(dialkylphosphinothioyl)disulfide.

2. A composition according to claim 1 wherein the technical grade malathion-soluble, synthetic organic insecticide is O,O-dimethyl S-(N-methylcarbamoylmethyl) phosphorodithioate.

3. A composition according to claim 1 wherein the technical grade malathion-soluble, synthetic organic insecticide is O,O-dimethyl-O-(3-methyl-4-nitrophenyl)thionophosphate.

4. A composition according to claim 1 wherein the technical grade malathion-soluble, synthetic organic insecticide is chlorinated camphene.

5. A composition according to claim 1 wherein the technical grade malathion-soluble, synthetic organic insecticide is O,O-diethyl O-p-nitrophenyl phosphorothioate.

6. A composition according to claim 1 wherein the technical grade malathion-soluble, synthetic organic insecticide is 2,2-bis-(p-chlorophenyl)-1,1,1-trichloroethane.

7. A composition according to claim 1 wherein the technical grade malathion-soluble, synthetic organic insecticide is O,O-dimethyl O-p-nitrophenyl phosphorothioate.

8. A composition according to claim 1 wherein the technical grade malathion-soluble, synthetic organic insecticide is O,O-dimethyl-O-2-chloro-4-nitrophenyl phosphorothioate.

9. A composition according to claim 1 wherein the technical grade malathion-soluble, synthetic organic insecticide is O,O-diethyl S-(ethylthiomethyl) phosphorothioate.

References Cited

UNITED STATES PATENTS 2,946,719  7/1960  Jones et al. _____ 167—22
2,961,370  11/1960  Jones et al. _____ 167—22

OTHER REFERENCES

Chem. Abstracts 52:14856a (1958).

LEWIS GOTTS, *Primary Examiner.*

SHEP K. ROSE, *Assistant Examiner.*